United States Patent [19]
Arzt

[11] Patent Number: 6,087,958
[45] Date of Patent: Jul. 11, 2000

[54] MULTI-STAGE ROUTING SWITCHERS WITH SEQUENTIAL AND NON-REPETITIVE DISTRIBUTIVE CIRCUIT INTERCONNECTIONS

[76] Inventor: Lawrence J. Arzt, 14070 Cartwright Way, Nevada City, Calif. 95959

[21] Appl. No.: 08/892,032

[22] Filed: Jul. 14, 1997

[51] Int. Cl.[7] .................................................. H04B 3/38
[52] U.S. Cl. ........................ 340/826; 370/216; 395/180
[58] Field of Search ........................... 340/826, 825.79, 340/827; 370/216, 217, 218, 219, 220; 395/180, 181

[56] References Cited

U.S. PATENT DOCUMENTS

| | | |
|---|---|---|
| 3,674,938 | 7/1972 | Jacob . |
| 4,566,007 | 1/1986 | Richards . |
| 4,817,083 | 3/1989 | Richards . |
| 4,983,961 | 1/1991 | Brunle et al. ..................... 340/825.8 |
| 5,032,837 | 7/1991 | Yoshifuji ........................... 340/825.8 |
| 5,285,444 | 2/1994 | Sakurai et al. . |
| 5,319,639 | 6/1994 | Guha . |
| 5,469,154 | 11/1995 | Karp . |
| 5,613,069 | 3/1997 | Walker ............................. 395/200.15 |

OTHER PUBLICATIONS

*The Bell System Technical Journal*, vol. XXXII, No. 2, dated Mar. 1953 pp. 406–424, "A Study of Non–Blocking Switching Networks" by Charles Clos.

*Primary Examiner*—Michael Horabik
*Assistant Examiner*—Anthony A. Asongwed
*Attorney, Agent, or Firm*—Heisler & Associates

[57] ABSTRACT

Large scale, multi-stage switching networks for selectively routing electrical signals from a plurality of inputs to one or more of a plurality of outputs. In one embodiment, the network is comprised of first and second banks of switching matrices. The matrices within each bank are further grouped into primary, secondary, and tertiary stages. Each input circuit is interconnected to a respective input of one of the primary matrices within each bank, and each output circuit is interconnected to a respective output of one of the tertiary matrices within each bank. However, the input and output interconnections for the first and second banks are made in a significantly different fashion. A sequential, distributive connection is used inputs/outputs of the first bank, and a non-repetitive, distributive connection is used for inputs/outputs of the second bank. Non-repetitive, distributive interconnections are also provided between the primary/secondary stages, and between the secondary/tertiary stages. A user interface, interconnected to a computer and associated path solution software, displays existing input and output circuits for the network. The user selects the desired input to output(s) interconnection, and the software effects the most effective signal routing through the network, The unique interconnection scheme among the network elements reduces and number of switches required for large-scale networks, and eliminates signal blocking through the network.

24 Claims, 9 Drawing Sheets

MULTI-STAGE ROUTING SWITCHERS WITH SEQUENTIAL AND NON-REPETITIVE DISTRIBUTIVE CIRCUIT INTERCONNECTIONS

BACKGROUND OF THE INVENTION

1. Field of the Invention

The invention relates generally to switching networks including a plurality of inputs and a plurality of outputs, adapted to route an electrical signal from a selected input to one or more outputs. More particularly, the invention pertains to multi-stage routing switchers, employing special distributive interconnections among plural switching matrices, and further including computerized control systems for routing signals through the matrices, to effect the desired electrical signal routing and distribution.

2. Description of Prior Art

Electrical signal switching networks, or signal routers, are used in a variety of electronic communication applications, such as routing a telephone call from its place of origin to a selected destination. Switching networks are also used to distribute video signals, whether in analog or digital form, from a single input to one or more selected outputs. Thus, for example, a television production studio uses a switching network to distribute a single video signal from a studio camera or a video tape recorder, to a plurality of devices, each having a video input for that signal. These devices would include a video transmitter, another video tape recorder, a monitor, or a video processing unit.

One of the major differences between telephone switchers and video switchers is the requirement that video and audio switchers used for television production have the capability to distribute a single input signal to one or a plurality of selected outputs. Also, video and audio switchers should be "non-blocking", in the sense that the selected distribution of the signal can always be effected by the switcher, and not thwarted by preexisting circuit commitments. Telephone switchers, on the other hand, are commercially acceptable if blocking the desired signal routing occurs on an occasional basis. While an infrequent "busy signal" may be tolerated for commercial telephone operations, it is not acceptable for video switching applications where the inability properly to route a commercial or a live satellite feed may prove very costly.

The most basic form of a switching network is a "two by one", or "single bus" switch. Such a switch includes two inputs and a single output. In this most basic configuration, it has two crosspoints, or switch points, equal to the number of input sources. If another output is added to this basic switching network, the required number of crosspoints doubles.

If this switching network is expanded, for example, to a single stage, square matrix array, having an equal number of inputs N and outputs N, the product of inputs N and outputs N ($N^2$) determines the total number of crosspoints required for the matrix. Since increasing the number of inputs and outputs results in an exponential increase in the number of crosspoint switches, large scale switchers of this design, whether rectangular or square in configuration, require an unacceptably high number of crosspoint switches. Moreover, it can mathematically be demonstrated that where the number of both the inputs and the outputs required by the network exceeds thirty-six, different arrangements of plural matrices will reduce the total number of switches, or crosspoints in the system, compared to a single stage matrix switcher.

The prior art also teaches more complex switching networks, known as multi-stage routers, which use various numbers and arrangements of switching matrices in combination. These multi-stage routers display the benefit of reduced numbers of crosspoint switches, for large scale switching networks. Multi-stage routers also provide better, but not absolute protection, against signal blocking, when called upon to perform distributive signal routing to more than one output.

In a seminal article entitled, "A Study of Non-Blocking Switching Networks", published in the March, 1953 issue of *The Bell System Technical Journal*, Charles Clos explained the characteristics and advantages of multi-stage switching arrays. Today, Clos multi-stage signal routers are widely known in the industry, and many commercially available routers are based upon Clos' initial design. As described above, when these switchers are called upon to perform the distributive signal routing required by the television industry, they still may block. This signal blocking may in some instances be cured, because control systems are capable of re-assigning, or re-arranging circuits through a different set of switch interconnections, relieving the temporary blocking condition which existed. Other times, re-assignment is ineffective in establishing a new circuit route, and the signal blocking is then absolute.

In U.S. Pat. No. 4,566,007 issued to Richards, a two-stage, re-arrangeable switching network is disclosed. Richards teaches a special "connection arrangement", posited between the input channels and the first stage switching matrices. In FIG. 3 of Richards, it should be noted that each input channel input is interconnected to two different 5×1 matrix switches. These 5×1 switches may be divided into two groups, a first group including switches 101–105, and a second group including switches 106–110.

Making reference to input IC1, for example, note that it is interconnected both to a first input of switch 101 and to a first input of switch 106. IC2, however, is interconnected to a second input of switch 101, and to a first input of switch 107. It is evident that connections to the first group of switches are made in a sequential, distributive fashion, each successive input channel being fed to the next sequentially available input terminal among the first group of switches.

Connections to the second group of switches (106–110) are quite different, being made in a non-repetitive, distributive manner. Thus, numerically adjacent input channels display a non-repetitive connection characteristic, by not repeating connections to the same switch of the second group. Moreover, there is a predetermined numerical increment, or pattern, between successive connections for the input channels. This is different than the sequential increment connections, characteristic of the first group of switches. It is this difference between the nature of the interconnections for the first and second groups of switches which prevents blocking for any combination of input and output signal routing selection.

In Karp, U.S. Pat. No. 5,469,154, both two and three-stage re-arrangeable switching networks are shown. In the three-stage network shown in FIG. 2, each output of each first-stage switching "crossbar", or matrix, connects to two second-stage matrices. Karp describes his interconnection pattern between the first and second stages as based upon "addition mod 15". The interconnections between the second and third stages are similar to that of a standard Clos network, in that each third-stage matrix receives one input from each second-stage matrix.

Figure 6:
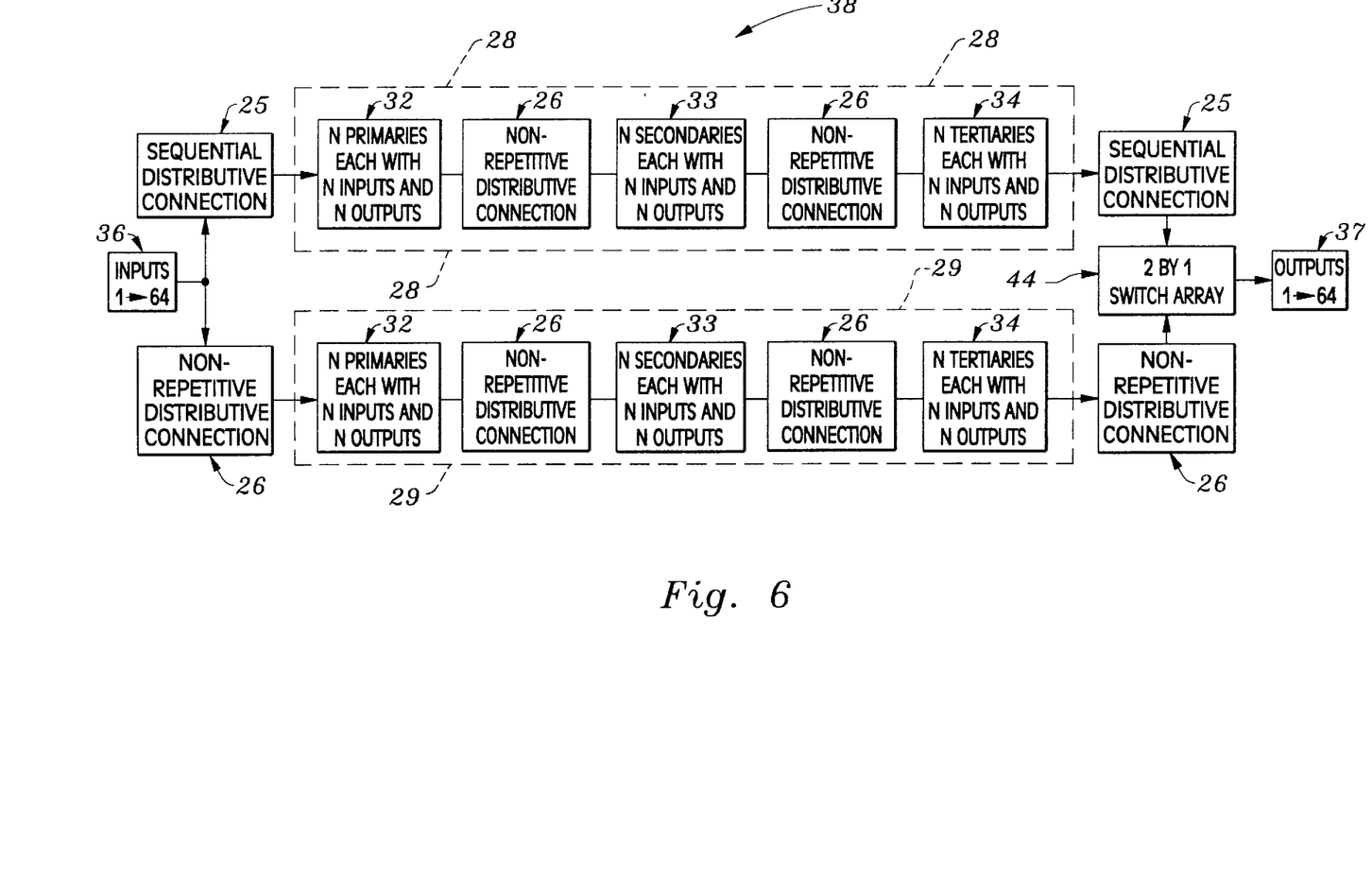
FIG. 6 is a functional block diagram of a second embodiment of the three-stage switching network of the present invention.

In Karp's two-stage network shown in FIG. 6, the inputs to the first-stage of the switching network are connected to two separate groups of first stage switches, called "upper crossbars" and "lower crossbars". In that regard, Karp's input circuitry is similar in principle to that shown in Richards '007, described above. Interconnections between the first and second stages are analogous to that of a standard Clos network, with all eighteen second stage "crossbars" receiving individual outputs from both upper and lower "crossbars".

Both the Richards and the Karp switching networks use a number of rectangular matrices of various sizes, having unequal numbers of inputs and outputs. The efficient manufacture of a large switching network logically calls for the use of as many common components as possible. It is an object of the present invention, therefore, to provide a switching network incorporating the same size matrix, or sub-switcher component, for all elements of all stages of the router.

In prior art switching networks, the matrices are interconnected in such a way that the failure of one or more matrices may adversely affect overall operation of the network. Accordingly, it is another object of the present invention to provide a network architecture having redundant banks, or gangs, each including primary, secondary, and tertiary switching matrices, interconnected in such a way as to minimize or avoid adverse effects of a failure of one or more of the matrices, or failure of the power supply or control system for one of the banks of matrices.

A need also exists for a large scale, non-blocking electrical signal router, which uses a minimum number of crosspoints or switches, and requires fewer switching reassignments by its signal routing control system than prior art devices. It is therefore a further object of the present invention to satisfy such a need, by providing a signal router having a dual-bank array of switch matrices, each bank having primary, secondary, and tertiary stages, and in which various combinations of sequential distributive and non-repeating distributive interconnections are made, to the input and output circuits of both banks.

SUMMARY OF THE INVENTION

The present invention preferably uses square matrices, of the desired size, as the primary components of a large scale, multi-stage, switching network. The matrices are arranged into parallel, first and second banks, or arrays, each including primary, secondary, and tertiary stages of equal numbers of matrices.

In a first embodiment of the invention, the inputs of the routing switcher, and the inputs to the first and second banks, are all connected to each other in parallel, following a numerically sequential, distributive connection arrangement. Output circuits extend from the outputs of the first and second banks, using the same sequential, distributive connection arrangement used at the inputs. Numerically sequential pairs of these output circuits from each bank are connected to the inputs of respective 2 by 1 switches. Outputs from each 2 by 1 switch lead to the outputs of the switcher.

In a second embodiment of the invention, special input and output interconnections are provided both between the banks themselves, and between the banks and the input and output circuits of the network. Each input circuit is connected first to a respective input connection of a matrix in the primary stage of the first bank, in numerically sequential, distributive fashion. Each input circuit is also connected to a respective input connection of a matrix in the primary stage of the second bank, in non-repetitive, distributive fashion. Using the same combination of first bank sequential and second bank non-repetitive connections, the respective output connections of the tertiary stages of the first and second banks, are connected to pairs of inputs in a 2 by 1 switch array. As with the first embodiment, the outputs of the 2 by 1 array are connected to outputs of the switcher.

In a third, hybrid embodiment of the invention, the special connection arrangement of the second embodiment is used between the input circuits of the network and the inputs of the first and second banks. In other words, each input circuit is first connected to a respective input connection of a matrix in the primary stage of the first bank, in sequential, distributive fashion; and, each input circuit is also connected to a respective input connection of a matrix in the primary stage of the second bank, in non-repetitive, distributive fashion. However, the outputs of the tertiary stages of the first and second banks are connected to a 2 by 1 switch array using the numerically sequential, distributive connection scheme of the first embodiment. Outputs of the 2 by 1 switch array are connected to respective outputs of the switcher, as with the other two embodiments.

In using the switching network of the present invention, a user enters commands for the desired distribution of an input signal to one or more output destinations. Then, a computer-based path solution controller determines which path the signal should take through the network. If required, as a consequence of pre-existing signal paths already in use through the network, the controller rearranges signal paths to ensure that no blocking of the new signal assignment occurs.

DETAILED DESCRIPTION OF THE PREFERRED EMBODIMENT

Figures 1, 2:
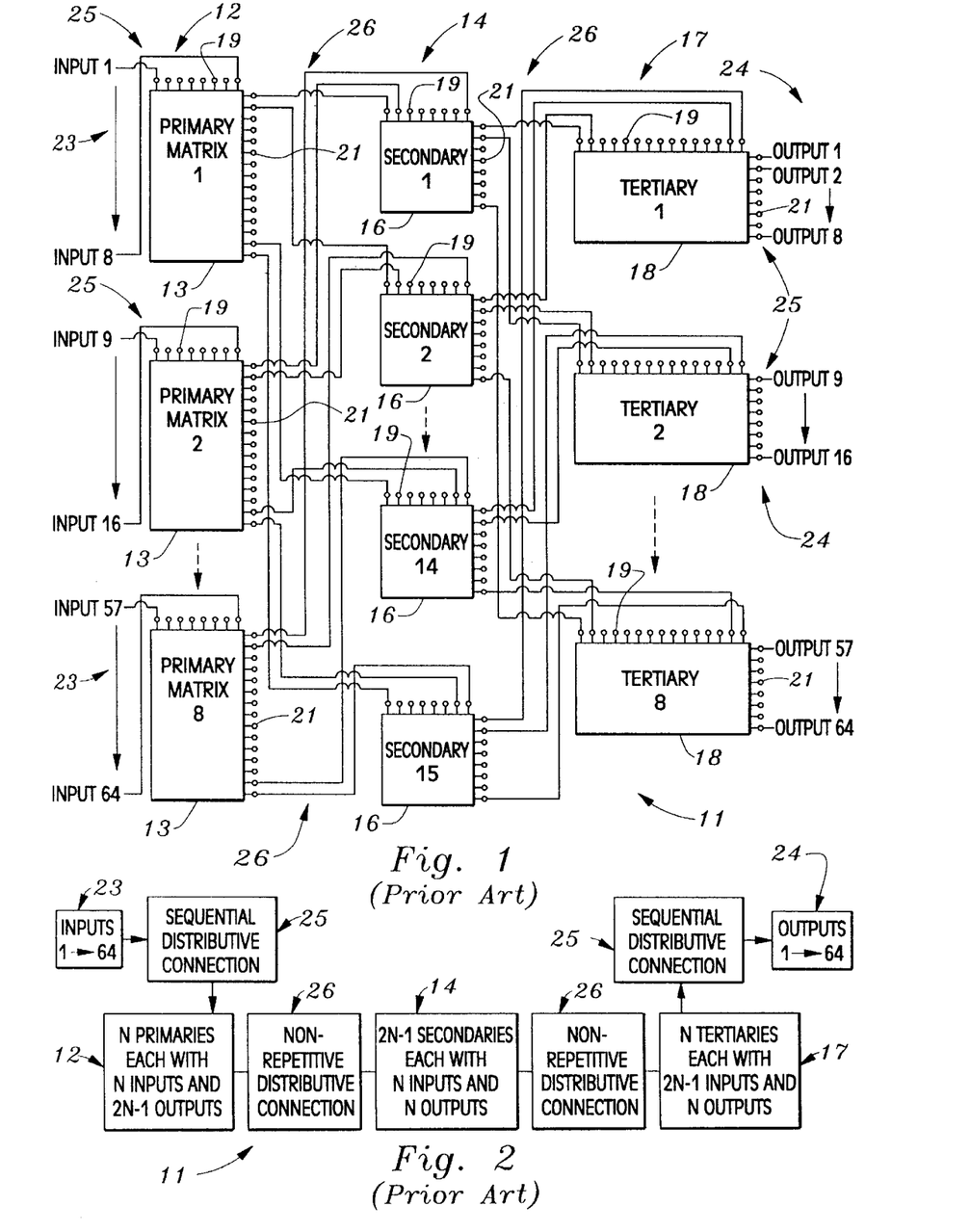
FIG. 1 is a simplified schematic of a three-stage prior art switching network, using both rectangular and square matrices.
FIG. 2 is a functional block diagram of the switching network of FIG. 1.

Turning now to the drawings, FIG. 1 shows a prior art multi-stage, routing switcher 11, based upon the Clos design. The switcher 11 includes a primary stage 12 having eight, 8×15 primary switching matrices 13, a secondary stage 14 having fifteen, 8×8 secondary switching matrices 16, and a tertiary stage 17 having eight, 15×8 tertiary switching matrices 18.

Figure 4:
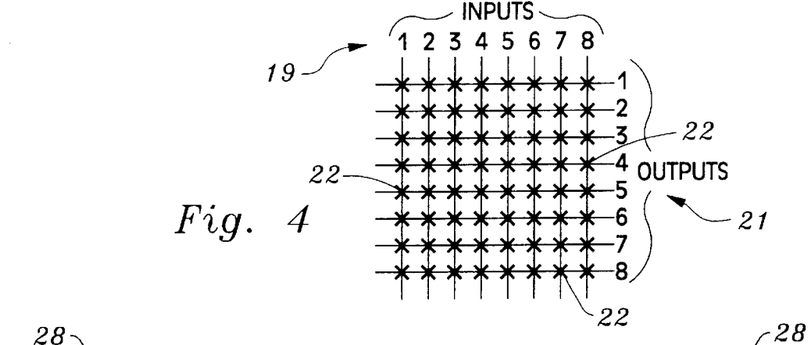
FIG. 4 is a representation of an 8×8 square switching matrix.

A more detailed rendition of an 8×8 secondary switching matrix 16 is shown in FIG. 4. Such a matrix is typical of all of the matrices to be discussed herein, in that it includes a plurality of input terminals 19, a plurality of output terminals 21, and a plurality of crosspoints 22, or semi-conductor switches. These designations, input terminals 19 and output terminals 21, will be used hereafter to identify all input and all output terminals of all matrices, irrespective of whether square or rectangular in configuration. The particular matrix shown in FIG. 4 includes eight input terminals 19, eight output terminals 21, and sixty-four switches 22. By means of external control components (not shown), switches 22 are selectively actuated to establish a path or a complete circuit, for an electrical program signal to pass from a particular input terminal to a particular output terminal.

Switcher 11 includes network inputs 23 (numbers 1–64), for interconnection to an electrical program signal source. Depending upon the application, that electrical signal may be an audio or a video signal, either in analog or in digital form. Each input 23 is sequentially, distributively connected 25 to a respective input terminal of a primary matrix 13. By sequential, it is meant that successive network inputs are connected in numerically like succession to input terminals of a matrix. For example, inputs numbered 1–8 are connected to input terminals 19 (numbered 1–8) of primary matrix 13 (number 1). And, inputs numbered 9–16 are connected to input terminals 19 (numbered 9–16) of primary matrix 13 (number 2). This numerically sequential, distributive connection 25 is continued for all of the sixty-four inputs 23.

In like fashion, network outputs 24 (numbered 1–64) are provided, for interconnection to an electrical signal destination. As shown in FIG. 1, each output 24 is sequentially, distributively connected to a respective output terminal 21, of a tertiary matrix 18.

A more generalized, block diagram depiction of the prior art router 11 is shown in FIG. 2. It should be noted that in such a router, $N^2$ equals the number of inputs and outputs. The primary stage 12 includes N primary matrices, each having N inputs and 2N–1 outputs; the secondary stage 14 includes 2N–1 secondary matrices, each having N inputs and N outputs; and, the tertiary stage 17 includes N tertiary matrices, each having 2N–1 inputs and N outputs.

As indicated in FIG. 2, non-repetitive, distributive interconnections 26 are used both between primary stage 12 and secondary stage 14, and between secondary stage 14 and tertiary stage 17. A more detailed showing of the characteristics of non-repetitive distributive interconnection 26 is included in FIG. 1. The first output terminal 21 of primary matrix (number 1) is interconnected to the first input terminal 19 of secondary matrix (number 1). Note, however, that the second output terminal 21 of primary matrix (number 1) is interconnected to the first input terminal 19 of a different secondary matrix (number 2). In identical manner, the successive outputs are distributively connected between the two stages, so that the sixteenth output terminal 21 of primary matrix (number 1) is interconnected to the first input terminal 19 of secondary matrix (number 15). Following this incremental connection scheme, no output of primary matrix 12 (number 1) is connected to the same secondary matrix 14. Because no output group of a particular matrix repeats a connection to a matrix previously connected by an output of the same output group, the scheme is characterized by applicant as a non-repetitive, distributive connection 26.

Figure 3A:
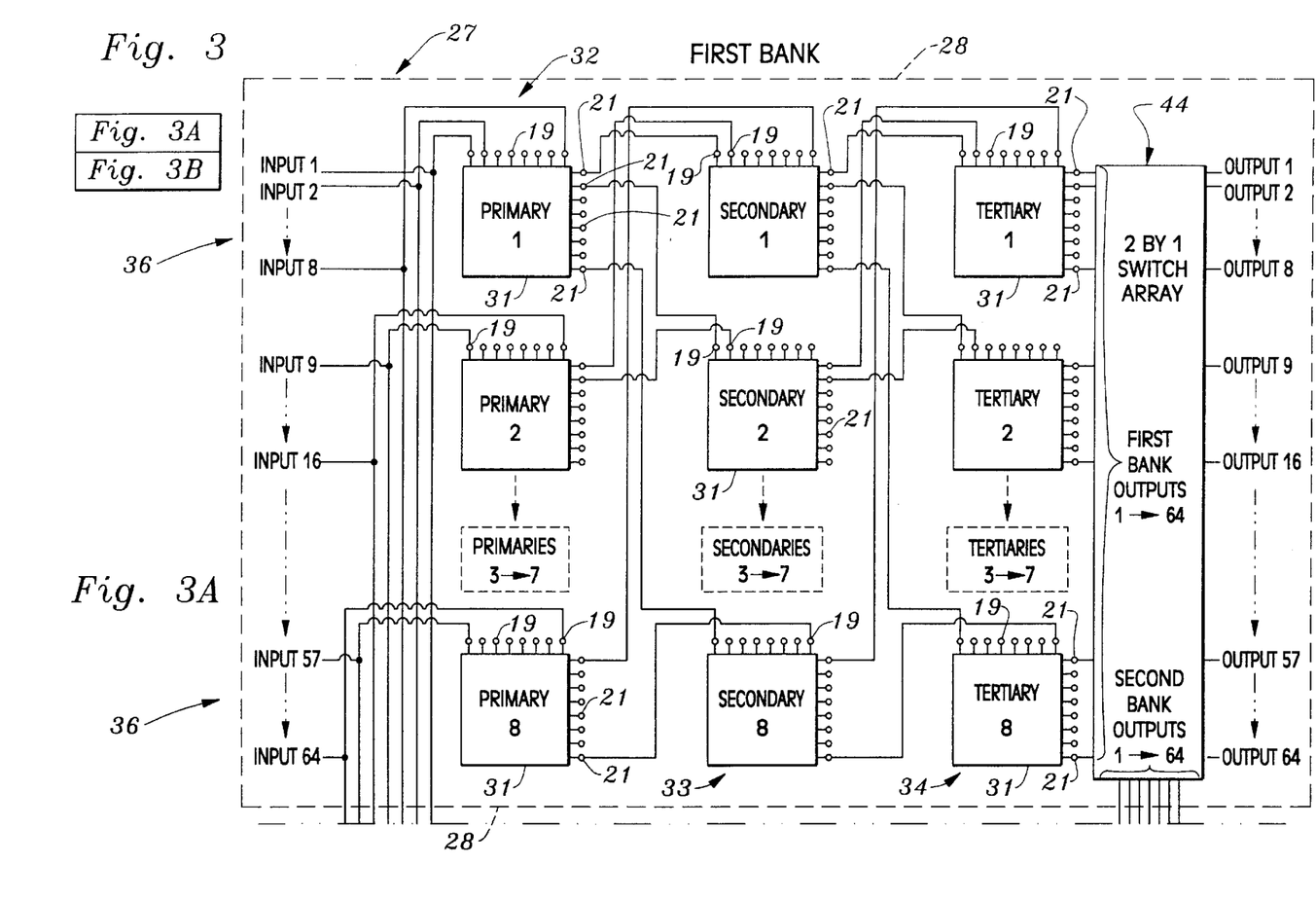
FIGS. 3A and 3B comprise a simplified schematic of a first embodiment of the three-stage switching network of the present invention, using square matrices and having first and second banks of matrices interconnected only at their inputs and outputs.
Figure 3B:
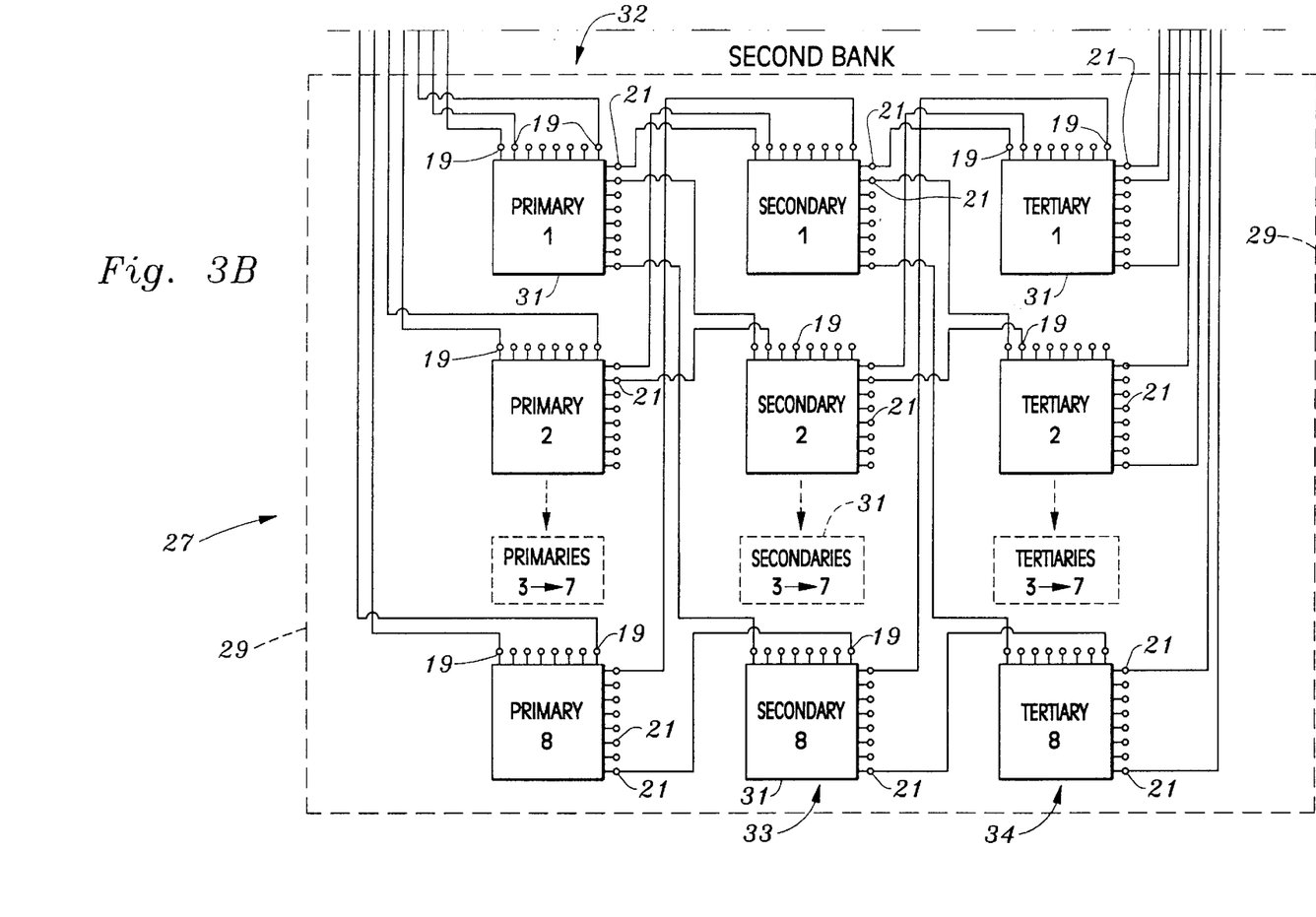
Figure 5:
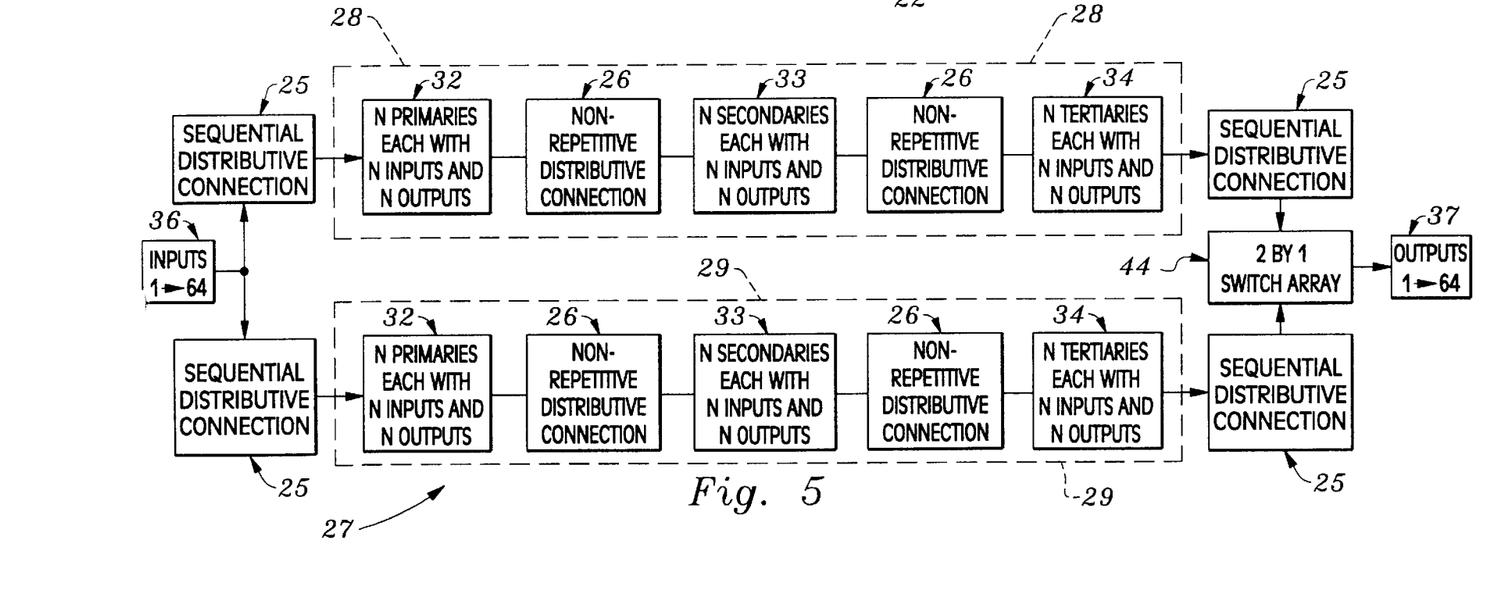
FIG. 5 is a functional block diagram of the switching network of FIGS. 3A and 3B.

A first embodiment of the present invention, switching network 27, is shown in FIGS. 3A and 3B, and in FIG. 5. One of the principal features of this embodiment is the inclusion of switching matrices arranged in a first bank 28 and a second bank 29. As with the prior art design, the number of network inputs and outputs equals $N^2$. However, network 27 uses identical square switching matrices 31 for all of the network switching functions, each matrix having N inputs and N outputs.

Matrices 31 used in describing network 27 are identical to the secondary matrices 16, shown in FIG. 4. Matrices 16 are sized to include eight inputs and eight outputs. However, the invention is not limited to this particular matrix size, or necessarily to square matrices. Any matrix, preferably square and sized in binary increments of 4, 8, 16, 32, 64, and so on, may be used. Other intermediate sizes may also be used, but since such sizes are not common parts in the industry, it is easier and less expensive in manufacturing large-scale switching routers to use the suggested sizes and configurations.

First bank 28 includes matrices 31 assembled into a primary stage 32, a secondary stage 33, and a tertiary stage 34. In the embodiment shown, each of the three stages of the first bank 28 is provided with eight of the matrices 31, with each matrix having 8 inputs and 8 outputs. These numbers would change, of course, for differently sized switching networks. Second bank 29 is identically configured to first bank 28, including eight identical matrices 31 in each of the primary, secondary, and tertiary stages. As will be explained herein, these first and second matrix banks provide parallel and redundant program signal paths, because they function substantially independently from each other. Thus, a failure of a component in one of the banks would not necessarily compromise the ability of the second bank to provide a suitable signal path. This arrangement is distinguishable over known prior art networks, which do not include at least two separate banks or arrays of multi-staged matrices, arranged in parallel fashion. It is also contemplated that more than two independent banks could be employed in a switching network requiring a larger size, or even further redundancy.

Network inputs 36, are inclusive of separate signal inputs numbered one through sixty-four. Connections are made from each input to the matrices of primary stage 32 of both the first bank 28 and the second bank 29, in sequential, distributive fashion, as described above. Thus, the inputs numbered 1 and 2 are connected the first and second input terminals 19, of primary stage matrix number 1, in the first bank 28. And, the input numbered 64 is connected to the eighth input terminal 19, of primary stage matrix number 8, also in the first bank. Second bank connections are made in the identical manner, as shown in FIG. 3B. In effect, the primary stages of banks 28 and 29 are connected in parallel, with each corresponding input terminal 19 of each bank connected both together and to a respective input of network inputs 36. Thus, considered together, the wiring scheme for connecting the network inputs 36 with banks 28 and 29, is properly characterized as a parallel arrangement of sequential, distributive connections 25.

The tertiary stage matrices 34 include sixty-four outputs 21 from the first bank 28, and sixty-four outputs 21 from the second bank 29. The outputs 21 from each of the banks are interconnected to 2 by 1 switch array 44, using the sequential distributive connection scheme, described above. It should be noted that 2 by 1 switch array 44 includes sixty-four 2 by 1 switches, each having two inputs and one output. The outputs from the first output terminal of tertiary number 1, in the first and second banks, are connected to the first 2 by 1 switch. And, the output of this first 2 by 1 switch is connected to output number 1 of outputs 37. In like fashion, the outputs from the second output terminal of tertiary number 1, in the first and second banks, are connected to the second 2 by 1 switch. The output of this switch is connected to output number 2 of outputs 37.

The 2 by 1 switch array 44 is actuated to select one of the two input positions by a control signal, and route a program signal to the output. Preferably, the 2 by 1 switch array is designed to pass a program signal under a fault or failure condition. A 2 by 1 switch designed in this fashion acts like an OR Gate, in the event no control signal is received. Such a design ensures that if a program signal is present at the output of one of the tertiary matrices, it will be passed, even if a fault condition arises in the control system.

Network outputs 37 include sixty-four separate signal outputs, interconnected to the sixty-four outputs of switch array 44. The operation of switch array 44 is computer controlled, in accordance with predetermined logic and programming, to be discussed in more detail herein. In brief, a computer determines a path solution for a particular selected input to output(s) signal distribution, and sends a control signal to switch array 44 to select the output signal from the appropriate bank, and distribute that signal to the selected output(s).

Non-repetitive distributive connections 26 are used between the outputs of the primary stages 32 and the inputs of the secondary stages 33, and between the outputs of the secondary stages 33 and the inputs of the tertiary stages 34. For example, in the first bank 28, the first output terminal 21 of the primary matrix number 1, is connected to the first input terminal 19 of the secondary matrix number 1. However, the second output terminal 21 of the primary matrix number 1, is connected to the first input terminal 19 of the secondary matrix number 2.

The predetermined increment, or number of terminals skipped or jumped between successive input terminals of the secondary stage matrices, is eight. The effect of such stepped, or incremental interconnections is that no outputs from a given matrix will be connected to inputs in the same matrix of the next stage. In other words, any output from a matrix does not repeat a connection which has already been made by another output of the same matrix, to any matrix in the following stage. As will be discussed later, the increment used for such connections may either be fixed, or variable, as long as the increment effects the non-repeating, distributive connective feature. And, irrespective of whether the increment is fixed or variable, the computer control system and software must be programmed with the parameters of the increment, so that signal routing and routing reassignments can be performed.

The same non-repetitive, distributive connection scheme is used between the outputs of the secondary stages, and the inputs of the tertiary stages. For example, making reference to the second bank 29, the first output terminal 21 of secondary matrix number 1 is connected to the first input of tertiary matrix number 1. Skipping eight sequential terminals, the second output terminal 21 of secondary matrix number 1 is connected to the first input terminal 19 of tertiary matrix number 2. Similarly, the first output terminal 21 of secondary matrix number 8, is connected to the eighth input terminal 19 of tertiary matrix number 1.

In summary, the exemplary connection scheme used in routing switcher 27 displays first and second banks of primary, secondary, and tertiary matrices, having inputs connected in parallel, and outputs fed to a computer controlled 2 by 1 switch array delivering program signals to the switcher outputs. The input and output components are connected using numerically sequential, distributive connections 25. However, between the primary/secondary and secondary/tertiary stages, non-repetitive, distributive connections 26 are used. Although different connection arrangements may be used within the banks themselves, it is essential for the practice of this embodiment that at least two independent and parallel banks of multi-stage matrices are used, having only their respective primary stage inputs terminals connected in parallel fashion, and their tertiary stage outputs delivered to a 2 by 1 switch array, also known as a bus-type switch array.

In this first embodiment of the invention, the existence of two independent, but parallel-connected banks, allows a computer-based path solution controller, discussed herein, to route signals through the network, despite defects or failures within one of the banks. However, a disadvantage of the first embodiment is that when called upon to route substantial numbers of program signals, it can develop absolute signal path blockages. To address this problem, additional versions of the invention are taught herein.

Figures 7, 7A:
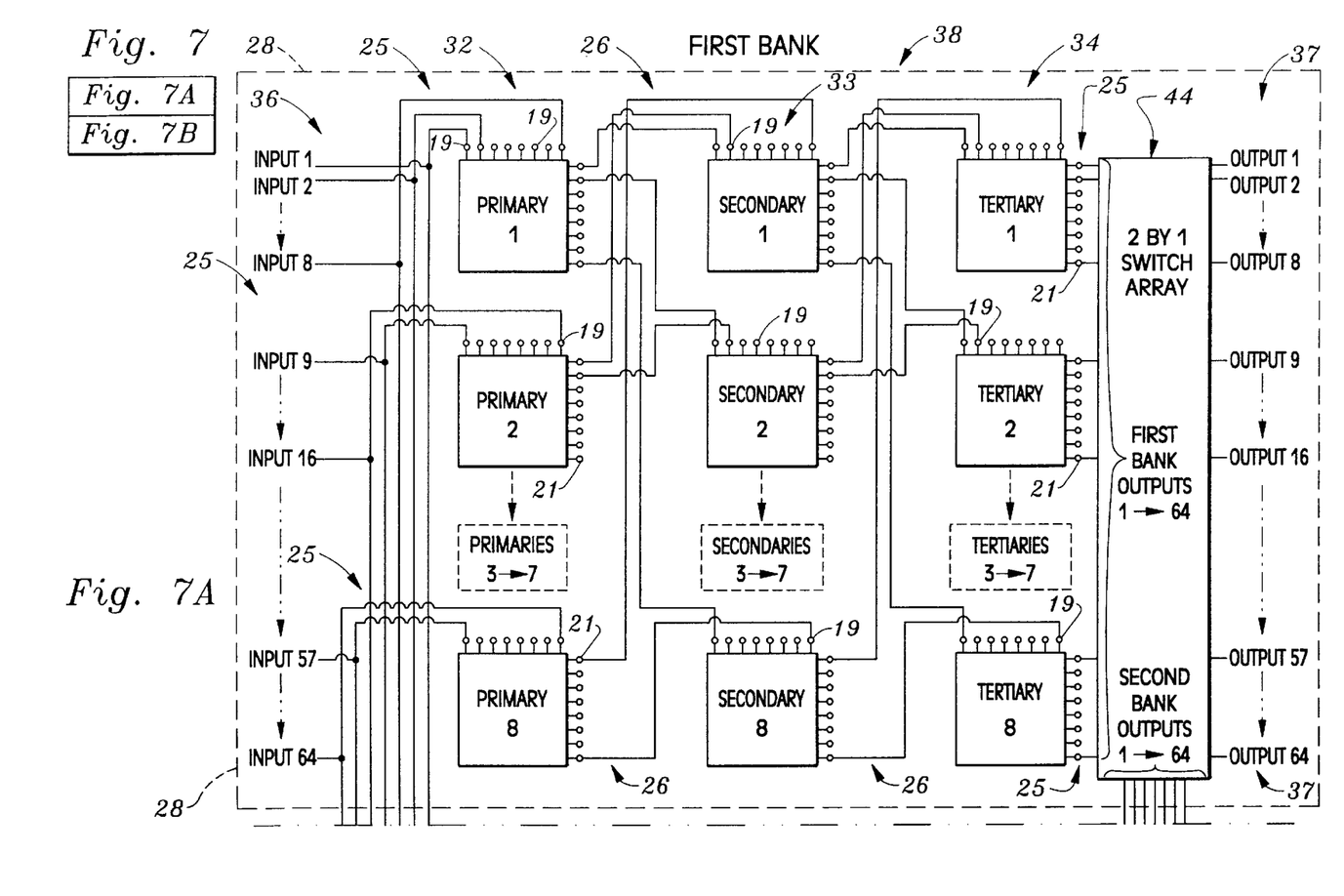
FIGS. 7A and 7B comprise a simplified schematic of a second embodiment of switching network.
Figure 7B:
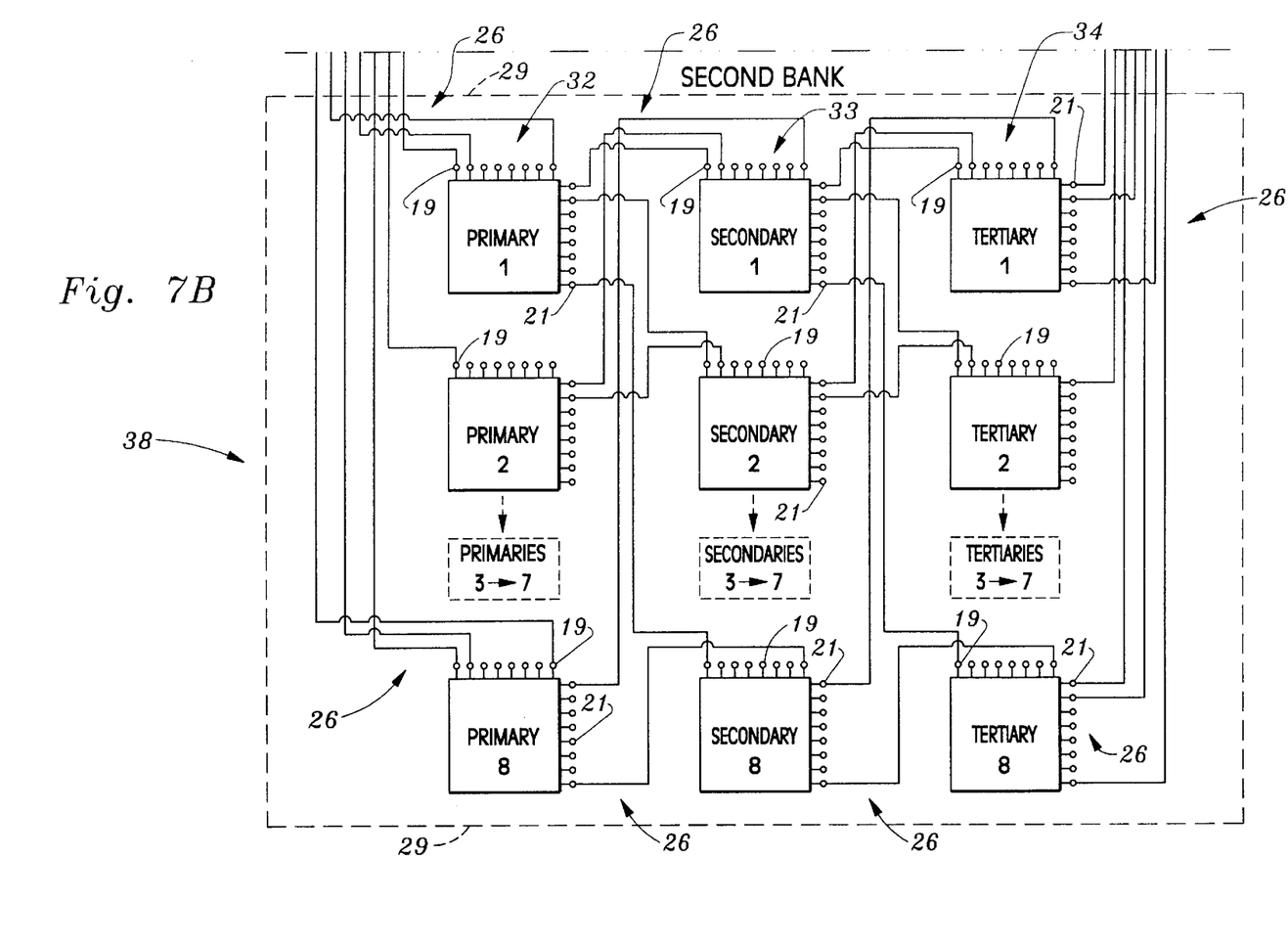
Figure 8:
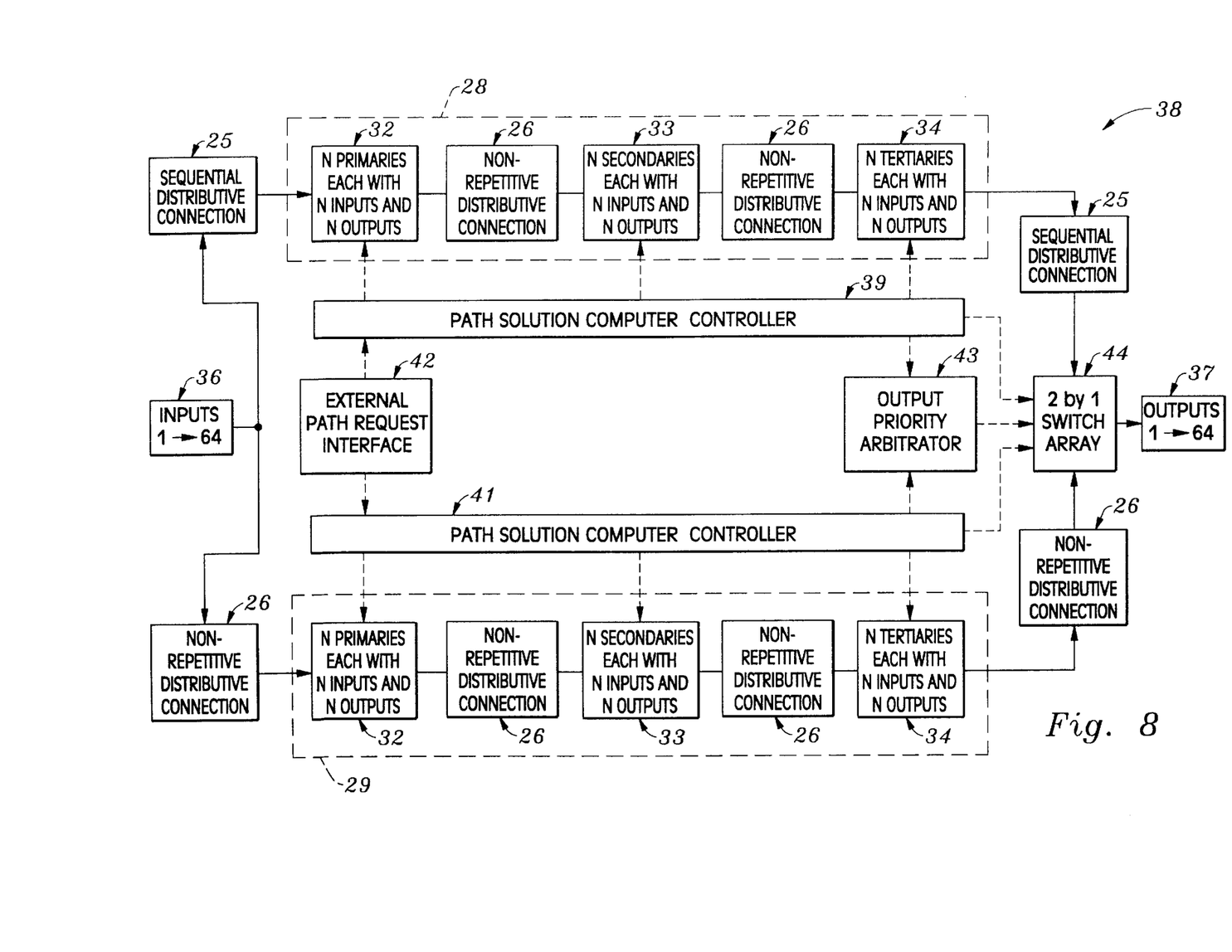
FIG. 8 is a more comprehensive functional block diagram of the second embodiment of the switching network, including a user interface, a computer-based path solution controller, and an arbitrator; and, FIG. 9 is a functional block diagram of the third embodiment of the switching network, including a user interface, a computer-based path solution controller, and an arbitrator.

A second embodiment of the invention is illustrated in the disclosure of routing switcher 38, shown in FIGS. 6–8. Routing switcher 38 shares a number of common components and connection schemes with those of routing switcher 27, discussed above. Therefore, in the interests of clarity and consistency, identical components and connection schemes which have previously been discussed will be identified with the same numerical designations, assigned in the explanation of the first embodiment of the invention.

Routing switcher 38 also utilizes matrices assembled in parallel switching banks 28 and 29, and enjoys the same reliability and redundancy benefits inherent with such an arrangement, as explained above. However, switcher 38 uses different combinations of connection schemes, both in its input and output circuits. These different connection schemes improve the performance of the switcher by eliminating signal blocking, and reducing incidents of signal re-routing or re-assignment through the switcher.

Turning now to FIGS. 7A and 7B, it will noted that network inputs 36 have sixty-four separate program signal inputs, each being connected to respective input terminals 19 in the first bank 28 and in the second bank 29. Input 1, for example, is connected both to a first input terminal 19 of primary matrix number 1 of the first bank 28, and to a first input terminal 19 of primary matrix number 1 of the second bank 29. Input 2 is connected both to a second input terminal 19 of primary matrix number 1, and to a first input terminal 19 of primary matrix number 2 of the second bank 29. In short, connections from the inputs to the primary matrices of the first bank are made using numerically sequential, distributive connections 25; and, connections from the inputs to the primary matrices of the second bank are made using non-repetitive, distributive connections 26.

This combination of sequential, distributive connections 25 and non-repetitive, distributive connections 26 is also used to make interconnections to the network outputs 37. In this way, the connection schemes from the inputs 36 to the inputs of the primary matrices of the banks and from the outputs of the tertiary matrices through 2 by 1 switch array 44 to the outputs 37, are mirror images of each other.

In all other respects, the components of banks 28 and 29 contained in routing switcher 38 are identical to those previously described in connection with routing switcher 27.

Each bank includes a primary stage 32, a secondary stage 33, and a tertiary stage 34. Non-repetitive, distributive connections 26 are used between the outputs of the primary stage 32 and the inputs of the secondary stage 33. Similarly, non-repetitive, distributive connections 26 are also used between the outputs of the secondary stage 33 and the inputs of the tertiary stage 34.

As shown in FIG. 8, computer control of the routing switcher 38 is effected through the use of first bank path solution computer controller 39 and second bank path solution controller 41. Each controller includes a microprocessor and control software. The use of two separate controllers maximizes the reliability of the first and second banks, and further enhances the redundancy feature in the event of a component failure in one of the banks or its control system.

By means of a user interface 42, an input program signal is selected to be routed to one or more outputs. Interface 42 would typically include a video display and a keyboard, or other equivalent means for first selecting an input signal, and then entering a selected output distribution for that signal. It should be noted that this same controller arrangement can be used for controlling the operation of the dual banks of matrices used in the first and third embodiments of the invention. However, these embodiments use somewhat different arbitration logic in the path solution controllers and the associated output priority arbitrator, as will be discussed herein.

After the signal distribution data is entered by the user, path solutions through the router are found by both controllers 39 and 41. An output priority arbitrator 43, including programmed arbitration criteria, decides which solution is better to use. The first criterion is whether the desired source or program signal, is already available in the first bank tertiary matrix, corresponding to the desired output. If it is, then that routing is selected as no additional links between the stages need to be used. If this first search for the source signal is negative, then the search is repeated for the second bank tertiary corresponding to the desired output. Again, if the source signal is found, then that routing is selected. This first level of path solution logic is used for all three embodiments of the invention.

The second criterion is whether the desired source signal is already available in either secondary stage of the first or second banks, having available connections to the desired tertiaries. If the source signal is available on a secondary matrix in one bank, and not the other, then the bank having the signal is selected. If both controllers find path solutions using their respective secondary stages, the arbitrator 43 selects a path through the bank having primary stage matrices with fewer active output terminals.

The third criterion assumes that analysis of criteria one and two has been unsuccessful. In that event, a new connection or circuit will have to be made from one of the two primary matrices having the source signal, to a secondary matrix having an output available to connect to one of the desired tertiaries. The primary which is selected, is the primary having the fewer number of outputs terminals in use.

In the event of a "tie", where two pimaries have the same number of terminals in use, signal path logic used only in the second embodiment compares the primary/secondary/tertiary path for the first bank to the corresponding path for the second bank. The path which results in fewer active input terminals in one of the two tertiaries is selected. In the event of a "tie" based on this criterion, the bank chosen by the arbitrator 43 is arbitrary. Then, when the following path solution is undertaken, the arbitrator will select the other bank, as fewer primary outputs or fewer tertiary inputs will be active in that bank. This will result in a first and second bank usage ratio which is very close to 50%/50%.

Special circumstances may require the setting of new switch or crosspoint actuation arrangements, in all three stages of the first and second banks. The controller first accesses the primary stage in either bank with the least number of active output terminals. If a path is found through one of the matrices to the input, then that path is selected. If a path is not available, then the controller reviews the primary stage in the other bank, in an effort to find a path. If neither attempt is successful, then a path rearrangement sequence is enabled.

Path re-arrangement is a recursive process carried out by the path solution controllers 39 and 41 and the arbitrator 43, in which successive pairs of possible signal paths through the matrix are exchanged. A solution for the new path request is then made. If a single pair path exchange does not result in a solution, the recursive process expands to exchanges of three paths before another attempt is made. The process continues, to the recursive expansion modules maximum of N, until a solution is found. Once a solution is found, the path solution controllers 39 and 41 effect the new path. The arbitrator 43 actuates a 2 by 1 switch array 44 to direct the source/program signal to the selected output.

Owing to its series position within the signal path, the reliability of switch array 44 is critical to the operation of the router. A switch that will always pass a signal upon switch failure is essential. Depending upon the application, switches within array 44 may vary in design from an electromechanical relay to a high-speed solid state switching device.

The unique combination of two different types of connection schemes, used both at the input and the output of the switching router's two banks, inherently provides non-blocking characteristics. Because a connection from a given input made to a matrix in the first bank, is not repeated in the corresponding connection made to a matrix in the second bank, there will always be an open signal path available. Thus, routing switcher 38 adds non-blocking performance to the redundancy feature of switcher 27.

Although not included in the basic block diagram of the first embodiment shown in FIG. 5, the path solution controllers and the output priority arbitrator used with the first embodiment are identical to the corresponding components shown in FIG. 8. However, the arbitration logic used for the first embodiment switcher 27 is more basic, reflecting the differences in the input and output connection schemes between the first and second embodiments. Because input connections to first bank 28 and second bank 29 in switcher 27 are in parallel, there is no advantage to distributing a plurality of signal routes throughout the two banks using arbitration rules or logic. Rather, if a path solution through the first bank exists, it will always be selected by the computer and arbitrator. The second bank will only be relied upon for a solution if no solution exists in the first bank.

As discussed above, the computer controller and arbitrator of switcher 27 always initially look to the tertiary matrices of first bank 28 for the signal. If the signal is not present, then the tertiary matrices of the second bank 29 are checked. If no signal is found, the secondary matrices of the first and second banks are checked in identical order. If no signal is found in the secondaries, then a path solution will be sought through the primary matrices, searching the first bank and then the second bank for a solution. It does not matter which bank is selected, as long as the source signal is available. Once determined, path solutions result in control signals being directed to the crossover switches 22 in the matrices 31, and the program signal is routed by 2 by 1 switch array 44 to the selected output(s).

Figure 9:
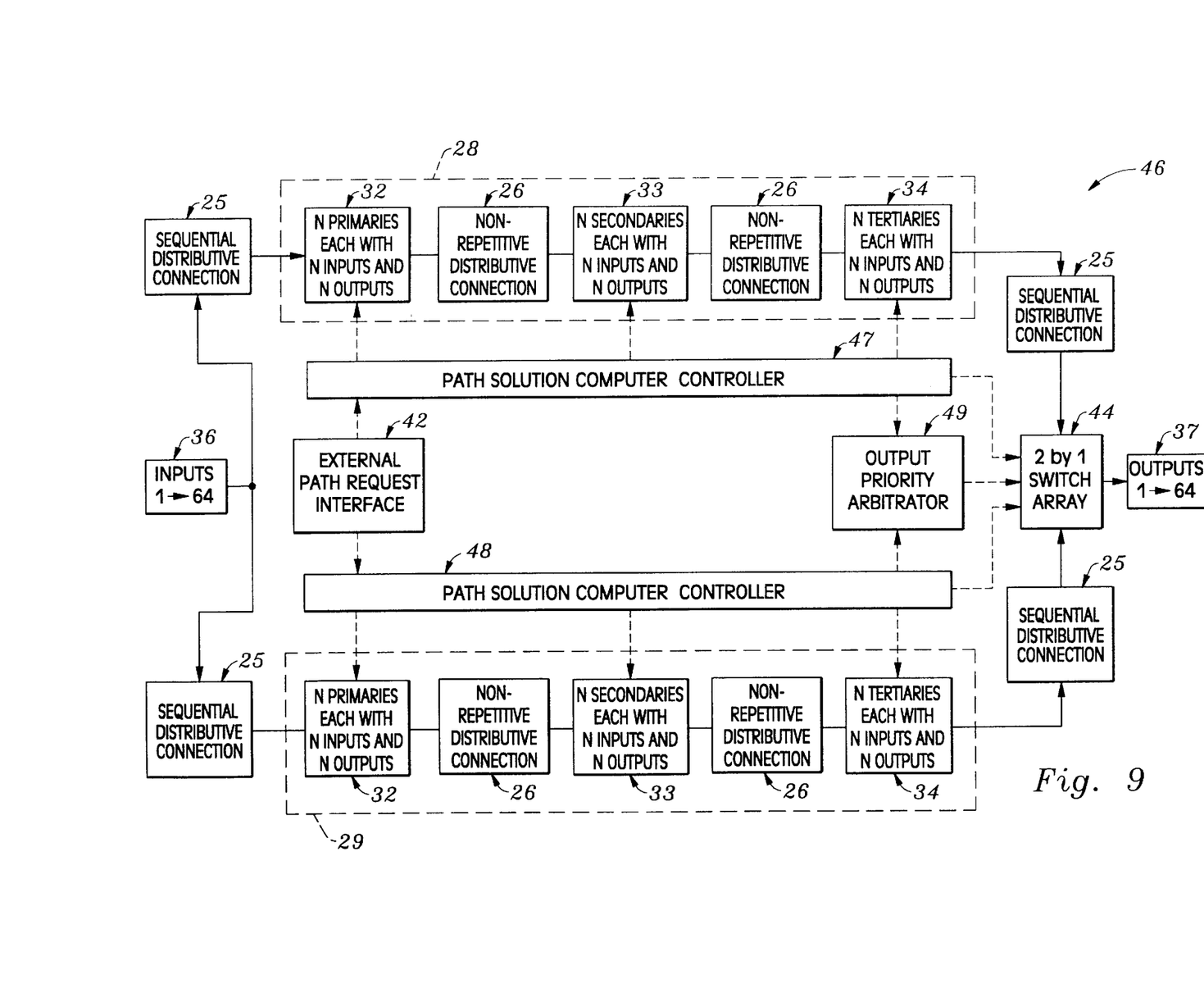

A third embodiment of the invention, router switcher 46, is depicted in FIG. 9. In general, switcher 46 represents a hybrid, or a cross, between switcher 27 and switcher 38. Switcher 46 uses the same input connection scheme as switcher 38. Thus, the inputs are connected to the first bank primaries using a numerically sequential distributive connection 25, and connected to the second bank primaries using a non-repetitive distributive connection 26.

However, the output connection scheme of switcher 46 is the same as that used in switcher 27. As shown in FIG. 9, a sequential distributive connection 25 is used at the outputs of the tertiary stages of both the first and second banks. And, as with switcher 27, these outputs are then delivered to 2 by 1 switch array 44, and on to outputs 37.

Because its input and output connection schemes are a hybrid, the arbitration rules and logic used for signal routing through switcher 46 are a hybrid as well. Switcher 46 includes path solution computer controllers 47 and 48, and an output priority arbitrator 49 to effect these different arbitration rules.

After a signal distribution request is entered by a user through interface 42, path solution computer controllers 47 and 48 look for solutions through both banks 28 and 29. Output priority arbitrator 49 decides which solution is better to use. As discussed above, the first criterion is whether the desired input signal is already available in either tertiary stage of the first or second banks. If it is, no additional interconnections between the stages need to be used, and the signal is routed through the 2 by 1 switch array 44 to the selected output(s). This is the same first level logic, or arbitration criterion, as switcher 38 employs.

The second criterion is whether the desired source signal is already available in either secondary stage of the first or second banks, having available connections to the desired tertiaries. If the source signal is available on a secondary matrix in one bank, and not the other, then the bank having the signal is selected. If both controllers find path solutions using their respective secondary stages, the arbitrator 43 selects a path through the bank having primary stage matrices with fewer active output terminals. This is also the identical path logic used by switcher 38, the second embodiment.

As explained above, the third criterion assumes that analysis of criteria one and two has been unsuccessful. If that is the case, a new connection or circuit will have to be made from one of the two primary matrices having the source signal, to a secondary matrix having an output available to connect to one of the desired tertiaries. The path solution selects the primary having the fewer number of outputs terminals in use. However, in the event of a "tie", the arbitrator 49 will arbitrarily select either bank, as one selection does not provide an operational advantage over the other. This is to be distinguished from the second embodiment, which includes a different output connection scheme and offers a fourth criterion for making advantageous path selections based thereon.

Unlike switcher 27, switcher 46 has no known input/output combinations, including distribution of a single source to multiple outputs, which will cause absolute blocking. However, switcher 46 will require more frequent path re-arrangement than switcher 38, because switcher 46 does not include a non-repetitive distributive connection 26, between the outputs of the tertiary stage and 2 by 1 switch array 44. Switcher 46 uses the same method for path re-arrangement as described previously in connection with switcher 38.

In summary, the third embodiment represents an improvement over the first embodiment with respect to blocking, but does not enjoy the low signal path re-arrangement characteristics of the second embodiment.

It will be appreciated, then, that I have described three embodiments of large scale signal switchers, employing multi-stage design to reduce the number of crosspoint switches required. Parallel arrangements of first and second banks of a plurality of matrices are used to provide signal path redundancy, and greater system reliability. The non-repetitive distributive interconnection scheme, as employed herein, also eliminates signal blocking and reduces the number of signal routing re-assignments, when repeating requests for the same signal source are made in combination with a large number of existing signal path assignments in the switcher.

What is claimed is:

1. An apparatus for switching electrical signals, comprising:

a. a plurality of signal inputs;

b. a primary stage switching network, said primary stage including a first bank of primary switching matrices and a second bank of primary switching matrices, said primary switching matrices including respective primary matrix inputs and primary matrix outputs;

c. means for distributively interconnecting each of said signal inputs both to a respective matrix input in said upper bank and to a respective matrix input in said lower bank;

d. a secondary stage switching network, said secondary stage including a first bank of secondary switching matrices and a second bank of secondary switching matrices, said secondary switching matrices including respective secondary matrix inputs and secondary matrix outputs;

e. first means for interconnecting outputs of said matrices in said first bank of said primary stage to said matrix inputs in said first bank of said secondary stage and for interconnecting outputs of said matrices in said second bank of said primary stage to said matrix inputs in said second bank of said secondary stage;

f. a tertiary stage switching network, said tertiary stage including a first bank of tertiary switching matrices and second bank of tertiary switching matrices, said tertiary switching matrices including respective tertiary matrix inputs and tertiary matrix outputs;

g. second means for interconnecting outputs of said matrices in said first bank of said secondary stage to said matrix inputs in said first bank of said tertiary stage, and for interconnecting outputs of said matrices in said second bank of said secondary stage to said matrix inputs in said second bank of said tertiary stage;

h. a plurality of signal outputs;

i. means for distributively interconnecting each of said respective matrix switching outputs in said first and second tertiary banks to a respective said signal output; and j. said first means for interconnecting outputs uses non-repetitive, distributive connections both between said primary and secondary matrices in said first bank, and between said primary and secondary matrices in said second bank.

2. An apparatus as in claim 1 which said switching matrices include a plurality of switches, and including control means for actuating said switches within said primary, secondary, and tertiary stages, for routing a signal from a predetermined said signal input to at least one predetermined said signal output.

3. An apparatus as in claim 1 in which said means for interconnecting said signal inputs with said first and second banks of said primary stage includes: sequential, distributive connections between each signal input and a respective input of primary matrices within said first bank; and, non-repetitive, distributive connections between each signal input and a respective input of primary matrices within said second bank.

4. An apparatus as in claim 1 which said means for interconnecting each of said respective matrix switching outputs in said first and second tertiary banks includes: sequential, distributive connections between each tertiary matrix output of said first bank and a respective signal output; and, non-repetitive, distributive connections between each tertiary matrix output of said second bank and a respective signal output.

5. An apparatus as in claim 1 further including at least thirty-six signal inputs and thirty-six signal outputs.

6. An apparatus as in claim 1 in which said switching matrices include identical numbers of said matrix inputs and matrix outputs.

7. An apparatus as in claim 6 whinch said switching matrices have at least eight matrix inputs and at least eight matrix outputs.

8. An apparatus as in claim 1, in which the numbers of switching matrices in said primary stage, said secondary stage, and said tertiary stage are identical.

9. An apparatus as in claim 1, in which said second means for interconnecting outputs uses non-repetitive distributive connections both between said secondary and tertiary matrices in said first bank, and between said secondary and tertiary matrices in said second bank.

10. An apparatus for switching electrical signals, comprising:
 a. a plurality of signal inputs for the electrical signals;
 b. first and second banks of switching matrices, each of said banks comprising:
  i. a primary stage switching network including a plurality of primary matrices, each of said primary matrices having respective primary matrix inputs and respective primary matrix outputs, said signal inputs being interconnected to said primary matrix inputs of said first and second banks using sequential, distributive connections;
  ii. a secondary stage switching network including a plurality of secondary matrices, each of said secondary matrices having respective secondary matrix inputs and respective secondary matrix outputs, said primary matrix outputs of said first bank being interconnected to said secondary matrix inputs of said first bank using non-repetitive, distributive connections, and said primary matrix outputs of said second bank being interconnected to said secondary matrix inputs of said second bank using non-repetitive, distributive connections;
  iii. a tertiary stage switching network including a plurality of tertiary matrices, each of said tertiary matrices having respective tertiary matrix inputs and respective tertiary matrix outputs, said secondary matrix outputs of said first bank being interconnected to said tertiary matrix inputs of said first bank using non-repetitive, distributive connections, and said secondary matrix outputs of said second bank being interconnected to said tertiary matrix inputs of said second bank using non-repetitive, distributive connections; and,
 c. a plurality of signal outputs, said signal outputs being connected to said tertiary matrix outputs of said first and second banks.

11. An apparatus as in claim 10 including a 2 by 1 switch array, said array including a plurality of 2 by 1 switches, each of said switches having inputs interconnected to a respective one of said matrix switching outputs in said upper and lower tertiary banks using sequential, distributive connections, and each of said switches having an output interconnected to a respective one of said signal outputs.

12. An apparatus as in claim 10 in which said switching matrices include a plurality of switches, and including control means for actuating said switches within said primary, secondary, and tertiary stages, for routing a signal from a predetermined said signal input to at least one predetermined said signal output.

13. An apparatus for switching electrical signals, comprising:
 a. a plurality of signal inputs for the electrical signals;
 b. first and second banks of switching matrices, each of said banks comprising:
  i. a primary stage switching network including a plurality of primary matrices, each of said primary matrices having respective primary matrix inputs and respective primary matrix outputs, said signal inputs being interconnected both to said primary matrix inputs of said first bank using sequential, distributive connections, and to said primary matrix inputs of said second bank using non-repetitive, distributive connections;
  ii. a secondary stage switching network including a plurality of secondary matrices, each of said secondary matrices having respective secondary matrix inputs and respective secondary matrix outputs, said primary matrix outputs of said first bank being interconnected to said secondary matrix inputs of said first bank using non-repetitive, distributive connections, and said primary matrix outputs of said second bank being interconnected to said secondary matrix inputs of said second bank using non-repetitive, distributive connections;
  iii. a tertiary stage switching network including a plurality of tertiary matrices, each of said tertiary matrices having respective tertiary matrix inputs and respective tertiary matrix outputs, said secondary matrix outputs of said first bank being interconnected to said tertiary matrix inputs of said first bank using non-repetitive, distributive connections, and said secondary matrix outputs of said second bank being interconnected to said tertiary matrix inputs of said second bank using non-repetitive, distributive connections;
 c. a plurality of signal outputs, said signal outputs being connected to said tertiary matrix outputs of said first and second banks; and
 d. including a 2 by 1 switch array, said array including a plurality of 2 by 1 switches, each of said switches having inputs interconnected to a respective one of said tertiary matrix outputs in said first and second banks using sequential, distributive connections, and each of said switches having an output interconnected to a respective one of said signal outputs.

14. An apparatus as in claim 13 in which said switching matrices include a plurality of switches, and including control means for actuating said switches within said primary, secondary, and tertiary stages, for routing a signal from a predetermined said signal input to at least one predetermined said signal output.

15. An apparatus for switching electrical signals, comprising:
   a. a plurality of signal inputs for the electrical signals;
   b. first and second banks of switching matrices, each of said banks comprising:
      i. a primary stage switching network including a plurality of primary matrices, each of said primary matrices having respective primary matrix inputs and respective primary matrix outputs, said signal inputs being interconnected both to said primary matrix inputs of said first bank using sequential, distributive connections, and to said primary matrix inputs of said second bank using non-repetitive, distributive connections;
      ii. a secondary stage switching network including a plurality of secondary matrices, each of said secondary matrices having respective secondary matrix inputs and respective secondary matrix outputs, said primary matrix outputs of said first bank being interconnected to said secondary matrix inputs of said first bank using non-repetitive, distributive connections, and said primary matrix outputs of said second bank being interconnected to said secondary matrix inputs of said second bank using non-repetitive, distributive connections;
      iii. a tertiary stage switching network including a plurality of tertiary matrices, each of said tertiary matrices having respective tertiary matrix inputs and respective tertiary matrix outputs, said secondary matrix outputs of said first bank being interconnected to said tertiary matrix inputs of said first bank using non-repetitive, distributive connections, and said secondary matrix outputs of said second bank being interconnected to said tertiary matrix inputs of said second bank using non-repetitive, distributive connections;
   c. a plurality of signal outputs, said outputs being interconnected to said tertiary matrix outputs of said first and second banks; and,
   d. a 2 by 1 switch array, said array including a plurality of 2 by 1 switches, each of said switches having a first input interconnected to a respective one of said tertiary matrix outputs in said first bank using sequential, distributive connections, and having a second input interconnected to a respective one of said tertiary matrix outputs in said second bank using non-repetitive, distributive connections, and having an output interconnected to a respective one of said signal outputs.

16. An apparatus as in claim 15 in which said switching matrices include a plurality of switches, and including control means for actuating said switches within said primary, secondary, and tertiary stages, for routing a signal from a predetermined said signal input to at least one predetermined said signal output.

17. An apparatus for switching electrical signals, comprising:
   a. a plurality of signal inputs for the electrical signals;
   b. first and second banks of switching matrices, each of said banks comprising:
      i. a primary stage switching network including a plurality of primary matrices, each of said primary matrices having respective primary matrix inputs and respective primary matrix outputs, said signal inputs being interconnected both to said primary matrix inputs of said first bank using sequential, distributive connections, and to said primary matrix inputs of said second bank using non-repetitive, distributive connections;
      ii. a secondary stage switching network including a plurality of secondary matrices, each of said secondary matrices having respective secondary matrix inputs and respective secondary matrix outputs, said primary matrix outputs of said first bank being interconnected to said secondary matrix inputs of said first bank using non-repetitive, distributive connections, and said primary matrix outputs of said second bank being interconnected to said secondary matrix inputs of said second bank using non-repetitive, distributive connections;
      iii. a tertiary stage switching network including a plurality of tertiary matrices, each of said tertiary matrices having respective tertiary matrix inputs and respective tertiary matrix outputs, said secondary matrix outputs of said first bank being interconnected to said tertiary matrix inputs of said first bank using non-repetitive, distributive connections, and said secondary matrix outputs of said second bank being interconnected to said tertiary matrix inputs of said second bank using non-repetitive, distributive connections; and,
   c. a plurality of signal outputs, said signal outputs being connected to said tertiary matrix outputs of said first and second banks.

18. The switching apparatus of claim 17 wherein said plurality of signal outputs are interconnected both to said tertiary matrix outputs of said first bank using sequential, distributive connections, and to said tertiary matrix outputs of said second bank using non-repetitive, distributive connections.

19. The switching apparatus of claim 18 wherein said tertiary matrix outputs of said first bank are recombined with said tertiary matrix outputs of said second bank.

20. The switching apparatus of claim 19 wherein said tertiary matrix outputs of said first bank are recombined with said tertiary matrix outputs of said second bank through a 2 by 1 switch array, said array including a plurality of 2 by 1 switches, each of said switches having a first input interconnected to a respective one of said tertiary matrix outputs and said first bank using sequential, distributive connections, and having a second input interconnected to a respective one of said tertiary matrix outputs in said second bank using non-repetitive, distributive connections, and having an output interconnected to a respective one of said signal outputs.

21. An apparatus for switching electrical signals, comprising:
   a. a plurality of signal inputs for the electrical signals;
   b. first and second banks of switching matrices, each of said banks comprising:
      i. a primary stage switching network including a plurality of primary matrices, each of said primary matrices having respective primary matrix inputs and respective primary matrix outputs, said signal inputs being interconnected both to said primary matrix inputs of said first bank using sequential, distributive connections, and to said primary matrix inputs of said second bank using non-repetitive, distributive connections;

ii. a secondary stage switching network including a plurality of secondary matrices, each of said secondary matrices having respective secondary matrix inputs and respective secondary matrix outputs, said primary matrix outputs of said first bank being interconnected to said secondary matrix inputs of said first bank using distributive connections, and said primary matrix outputs of said second bank being interconnected to said secondary matrix inputs of said second bank using distributive connections;

iii. a tertiary stage switching network including a plurality of tertiary matrices, each of said tertiary matrices having respective tertiary matrix inputs and respective tertiary matrix outputs, said secondary matrix outputs of said first bank being interconnected to said tertiary matrix inputs of said first bank using distributive connections, and said secondary matrix outputs of said second bank being interconnected to said tertiary matrix inputs of said second bank using distributive connections; and, c. a plurality of signal outputs, said signal outputs being connected to said tertiary matrix outputs of said first and second banks.

22. The switching apparatus of claim 21 wherein said plurality of signal outputs are interconnected both to said tertiary matrix outputs of said first bank using sequential, distributive connections, and to said tertiary matrix outputs of said second bank using non-repetitive, distributive connections.

23. The switching apparatus of claim 22 wherein said tertiary matrix outputs of said first bank are recombined with said tertiary matrix outputs of said second bank.

24. The switching apparatus of claim 23 wherein said tertiary matrix outputs of said first bank are recombined with said tertiary matrix outputs of said second bank through a 2 by 1 switch array, said array including a plurality of 2 by 1 switches, each of said switches having a first input interconnected to a respective one of said tertiary matrix outputs and said first bank using sequential, distributive connections, and having a second input interconnected to a respective one of said tertiary matrix outputs in said second bank using non-repetitive, distributive connections, and having an output interconnected to a respective one of said signal outputs.

* * * * *